US012352678B2

(12) United States Patent
Hiraoka et al.

(10) Patent No.: US 12,352,678 B2
(45) Date of Patent: *Jul. 8, 2025

(54) COUNTING METHOD AND COUNTING APPARATUS

(71) Applicant: Panasonic Intellectual Property Management Co., Ltd., Osaka (JP)

(72) Inventors: Rui Hiraoka, Osaka (JP); Satoshi Arimoto, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 254 days.

This patent is subject to a terminal disclaimer.

(21) Appl. No.: 17/938,375

(22) Filed: Oct. 6, 2022

(65) Prior Publication Data
US 2023/0028960 A1 Jan. 26, 2023

Related U.S. Application Data

(63) Continuation of application No. PCT/JP2021/013180, filed on Mar. 29, 2021.

(30) Foreign Application Priority Data

Apr. 28, 2020 (JP) .................. 2020-078982

(51) Int. Cl.
*G01N 15/04* (2006.01)
*G01N 15/06* (2006.01)
(Continued)

(52) U.S. Cl.
CPC ......... *G01N 15/06* (2013.01); *G01N 15/1404* (2013.01); *G01N 2015/1486* (2013.01)

(58) Field of Classification Search
CPC ............... G01N 15/06; G01N 15/1404; G01N 2015/1486; G91N 15/06; G91N 15/1404; G91N 2015/1486
See application file for complete search history.

(56) References Cited

U.S. PATENT DOCUMENTS 3,162,592 A * 12/1964 Ackland ................ B03C 5/026
209/127.1
4,326,934 A * 4/1982 Pohl ....................... C12N 13/00
204/547
(Continued)

FOREIGN PATENT DOCUMENTS

| JP | 2011-043450 | 3/2011 |
| JP | 2016-059906 | 4/2016 |

(Continued)

OTHER PUBLICATIONS

Gascoyne et al. "Dielectrophoretic Separation of Cancer Cells from Blood" IEEE Transactions on Industry Applications 0-7803-3008-0/95 (Year: 1995).*
(Continued)

Primary Examiner — John Fitzgerald
(74) Attorney, Agent, or Firm — WENDEROTH, LIND & PONACK, L.L.P.

(57) ABSTRACT

A counting method includes aggregating particles in a sample by action of first-direction dielectrophoretic force, dispersing the aggregated particles by action of second-direction dielectrophoretic force, which is different from the first-direction dielectrophoretic force, capturing a dispersion image including the dispersed particles, and determining the number of particles on the basis of the dispersion image.

7 Claims, 9 Drawing Sheets

(51) Int. Cl.
*G01N 15/1404* (2024.01)
*G01N 15/14* (2006.01)

(56) References Cited

U.S. PATENT DOCUMENTS

| | | | | |
|---|---|---|---|---|
| 5,814,200 | A * | 9/1998 | Pethig | B03C 5/005 204/547 |
| 5,993,630 | A * | 11/1999 | Becker | B03C 5/028 204/547 |
| 6,197,176 | B1 * | 3/2001 | Pethig | C12Q 1/24 204/232 |
| 6,287,832 | B1 * | 9/2001 | Becker | G01N 30/0005 435/173.9 |
| 6,749,736 | B1 * | 6/2004 | Fuhr | C12M 35/02 204/600 |
| 8,313,628 | B2 * | 11/2012 | Tsunazawa | G01N 21/4788 204/547 |
| 8,702,945 | B2 * | 4/2014 | Peach | G01N 30/0005 204/600 |
| 9,842,408 | B2 * | 12/2017 | Milne | G01N 21/8851 |
| 10,078,066 | B2 * | 9/2018 | Davalos | G01N 27/44791 |
| 11,519,877 | B2 * | 12/2022 | Davalos | B03C 5/026 |
| 11,731,132 | B2 * | 8/2023 | Krishnan | C12Q 1/6806 422/502 |
| 2004/0112748 | A1 * | 6/2004 | Lee | G01N 15/1031 204/547 |
| 2008/0011608 | A1 * | 1/2008 | Pham | B03C 5/026 204/643 |
| 2010/0012496 | A1 * | 1/2010 | Tsunazawa | B03C 5/026 204/547 |
| 2018/0149601 | A1 | 5/2018 | Enjoji et al. | |
| 2019/0234902 | A1 * | 8/2019 | Lima, Jr. | G01N 33/5438 |
| 2020/0139382 | A1 * | 5/2020 | Menachery | G01N 27/44713 |
| 2022/0299419 | A1 * | 9/2022 | Vidal | G01N 15/147 |
| 2023/0033118 | A1 * | 2/2023 | Hiraoka | G01N 15/0606 |

FOREIGN PATENT DOCUMENTS

| | | |
|---|---|---|
| JP | 2017-070281 | 4/2017 |
| KR | 20180033712 A * | 4/2018 |

OTHER PUBLICATIONS

Extended European Search Report dated Sep. 6, 2023 issued in corresponding European Patent Application No. 21797045.8.

Midelet et al., "Brownian Motion and Large Electric Polarizabilities Facilitate Dielectrophoretic Capture of Sub-200 nm Gold Nanoparticles in Water", Chemphyschem, Wiley-V CH Verlag Gmbh & Co. KGAA, DE, vol. 20, No. 24, Oct. 24, 2019 (Oct. 24, 2019), pp. 3354-3365, XP072151468.

Lee et al., "Optimizing Micromixer Design for Enhancing Dielectrophoretic Microconcentrator Performance", Analytical Chemistry, vol. 79, No. 5, Mar. 1, 2007 (Mar. 1, 2007), pp. 1833-1839, XP055019094.

International Search Report of PCT application No. PCT/JP2021/013180 dated Jun. 15, 2021.

* cited by examiner

COUNTING METHOD AND COUNTING APPARATUS

BACKGROUND

1. Technical Field

The present disclosure relates to a counting method and a counting apparatus for counting particles contained in a sample.

2. Description of the Related Art

A counting method for counting dielectric particles contained in a sample solution by collecting the dielectric particles in the sample solution through dielectrophoresis and analyzing an image of areas where the dielectric particles have been collected is known (refer to Japanese Unexamined Patent Application Publication No. 2017-70281).

SUMMARY

With the counting method disclosed in Japanese Unexamined Patent Application Publication No. 2017-70281, however, accurate counting might not be performed when a large number of dielectric particles exist in a sample, because false negatives might occur.

One non-limiting and exemplary embodiment provides a counting method and the like capable of reducing occurrence of false negatives and counting particles more accurately.

In one general aspect, the techniques disclosed here feature a counting method according to an aspect of the present disclosure includes aggregating particles in a sample by action of first-direction dielectrophoretic force, dispersing the aggregated particles by action of second-direction dielectrophoretic force, which is different from the first-direction dielectrophoretic force, capturing a dispersion image including the dispersed particles, and determining a number of the particles on a basis of the dispersion image.

With the counting method and the like in the present disclosure, particles can be counted more accurately.

It should be noted that these general or specific aspects may be implemented as a system, an apparatus, an integrated circuit, a computer program, a computer-readable storage medium such as a compact disc read-only memory (CD-ROM), or any selective combination of a method, an apparatus, a system, an integrated circuit, a computer program, and a storage medium. The computer-readable storage medium includes, for example, a nonvolatile storage medium such as a CD-ROM.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Underlying Knowledge Forming Basis of Disclosure

Figure 1:
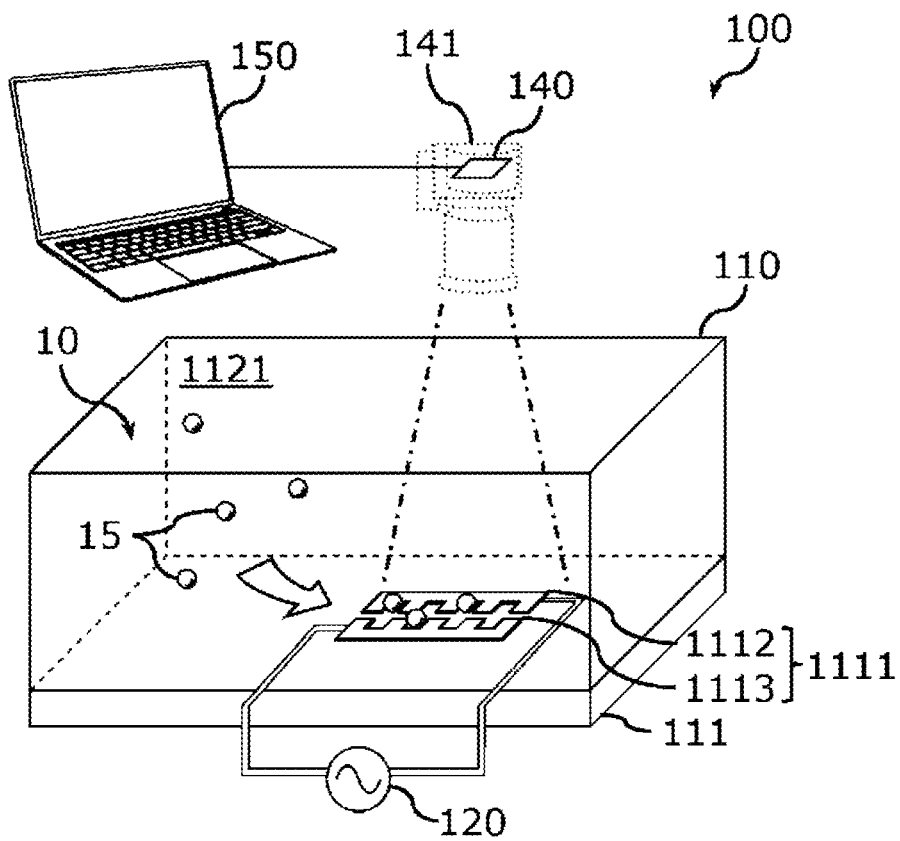
FIG. 1 is a perspective view illustrating a schematic configuration of a counting apparatus according to an embodiment.

A technique employing dielectrophoresis is known as a counting method for counting particles contained in a sample (hereinafter also referred to as a sample solution). For example, Japanese Unexamined Patent Application Publication No. 2017-70281 discloses a counting method for counting dielectric particles, which are particles to be counted, through dielectrophoresis. More specifically, in Japanese Unexamined Patent Application Publication No. 2017-70281, dielectric particles contained in a sample solution are counted by collecting dielectric particles in each of slit areas through dielectrophoresis and counting the number of slit areas saturated by the dielectric particles.

In general, dielectrophoresis is, as described above, a technique for collecting (i.e., aggregating) dielectric particles in certain areas, and only the dielectric particles can be moved to the certain areas. When a large number of dielectric particles exist in a sample, therefore, the large number of dielectric particles are aggregated in certain areas and accumulated in three dimensions. That is, with an image captured by an imaging device or the like from one direction, it is difficult to identify overlaps between dielectric particles caused by accumulation, and dielectric particles fewer than an actual number of dielectric particles contained are counted, that is, false negatives occur.

Due to these circumstances, it has been difficult to count dielectric particles accurately with conventional counting methods as known in Japanese Unexamined Patent Application Publication No. 2017-70281 and the like.

In a counting method and the like according to the present disclosure, therefore, aggregations caused by first dielectrophoresis (i.e., first-direction dielectrophoretic force) are dispersed by performing second dielectrophoresis (i.e., second-direction dielectrophoretic force) on particles aggregated by the action of first-direction dielectrophoresis. As a result, with the counting method and the like according to the present disclosure, particles can be counted with an effect of overlap between the particles reduced, and occurrence of false negatives due to aggregation is reduced, which makes it possible to count the particles more accurately.

Outline of Disclosure

A counting method according to an aspect of the present disclosure includes aggregating particles in a sample by action of first-direction dielectrophoretic force, dispersing the aggregated particles by action of second-direction dielectrophoretic force, which is different from the first-direction dielectrophoretic force, capturing a dispersion image including the dispersed particles, and determining a number of the particles on a basis of the dispersion image.

In this counting method, particles aggregated by the first-direction dielectrophoretic force are dispersed by the different second-direction dielectrophoretic force. That is, occurrence of false negatives, an example of which is a case where two particles look like one particle because of overlap between the particles due to aggregation, can be suppressed. With the counting method in the present disclosure, therefore, occurrence of false negatives due to aggregation is suppressed, and particles can be counted more accurately.

For example, in the aggregating, an alternating current voltage having a first frequency may be applied to an electrode set that generates an electric field gradient for exerting dielectrophoretic force. In the dispersing, an alternating current voltage having a second frequency, which is different from the first frequency, may be applied to the electrode set.

As a result, with the counting method in the present disclosure, a direction of dielectrophoretic force can be adjusted by the frequency of the alternating current voltage applied to the electrode set. The direction of dielectrophoretic force can thus be changed and aggregated particles can be dispersed by adjusting the frequency. With the counting method in the present disclosure, therefore, occurrence of false negatives due to aggregation is reduced, and particles can be counted more accurately.

For example, in the aggregating, an alternating current voltage having a first frequency may be applied to a first electrode set that generates an electric field gradient for exerting dielectrophoretic force. In the dispersing, an alternating current voltage having a second frequency, which is different from the first frequency, may be applied to a second electrode set, which is different from the first electrode set.

As a result, with the counting method in the present disclosure, the direction of dielectrophoretic force can be adjusted by the frequencies of the alternating current voltages applied to the first and second electrode sets. The direction of dielectrophoretic force can thus be changed and particles can be aggregated and dispersed by adjusting the frequencies applied to the two electrode sets. With the counting method in the present disclosure, therefore, occurrence of false negatives due to aggregation is reduced, and particles can be counted more accurately.

For example, in the dispersing, second-direction dielectrophoretic force higher than the first-direction dielectrophoretic force in the aggregating may be exerted.

As a result, with the counting method in the present disclosure, higher dielectrophoretic force can be exerted in the dispersing than in the aggregating, and aggregated particles can be dispersed more certainly. With the counting method in the present disclosure, therefore, occurrence of false negatives due to aggregation is reduced, and particles can be counted more accurately.

For example, either positive dielectrophoretic force or negative dielectrophoretic force may be exerted on the particles in the application of the alternating current voltage having the first frequency. Another of the positive dielectrophoretic force and the negative dielectrophoretic force may be exerted on the particles in the application of the alternating current voltage having the second frequency.

As a result, whether to exert positive dielectrophoretic force or negative dielectrophoretic force can be adjusted by the frequency of the alternating current voltage applied to the electrode set. The direction of dielectrophoretic force can thus be changed and aggregated particles can be dispersed by adjusting the frequency. With the counting method in the present disclosure, therefore, occurrence of false negatives due to aggregation is reduced, and particles can be counted more accurately.

For example, in the aggregating, an alternating current voltage may be applied, under first conductivity, to an electrode set that generates an electric field gradient for exerting dielectrophoretic force. In the dispersing, the alternating current voltage may be applied to the electrode set under second conductivity, which is different from the first conductivity.

As a result, with the counting method in the present disclosure, the direction of dielectrophoretic force can be adjusted by conductivity in an environment around particles. The direction of dielectrophoretic force can thus be changed and aggregated particles can be dispersed by adjusting the conductivity. With the counting method in the present disclosure, therefore, occurrence of false negatives due to aggregation is reduced, and particles can be counted more accurately.

For example, either positive dielectrophoretic force or negative dielectrophoretic force may be exerted on the particles in the application of the alternating current voltage under the first conductivity. Another of the positive dielectrophoretic force and the negative dielectrophoretic force may be exerted on the particles in the application of the alternating current voltage under the second conductivity.

As a result, whether to exert positive dielectrophoretic force or negative dielectrophoretic force can be adjusted by conductivity in an environment around particles. The direction of dielectrophoretic force can thus be changed and aggregated particles can be dispersed by adjusting the conductivity. With the counting method in the present disclosure, therefore, occurrence of false negatives due to aggregation is reduced, and particles can be counted more accurately.

For example, the counting method may further include capturing an aggregation image including the aggregated particles after the aggregating but before the dispersing and tracking the particles included in the captured aggregation image on a basis of the aggregation image and the dispersion image.

As a result, with the counting method in the present disclosure, particles can be counted on the basis of an aggregation image and a dispersion image before and after the particles are dispersed. When particles following different trajectories accidentally overlap each other during the dispersion, for example, the particles can be individually counted on the basis of the different trajectories. With the counting method in the present disclosure, therefore, occurrence of false negatives due to aggregation is reduced, and particles can be counted more accurately.

For example, in the tracking, whether the particles dispersed in the dispersing are the particles aggregated at a first position or the particles aggregated at a second position, which is different from the first position, in the aggregating may be determined.

As a result, with the counting method in the present disclosure, particles aggregated at the first position and the second position can be individually counted. When the first position and the second position are positions at which particles are aggregated through positive dielectrophoresis and negative dielectrophoresis, respectively, for example, the particles aggregated by the action of these different types of dielectrophoresis can be simultaneously and accurately counted. With the counting method in the present disclosure, therefore, occurrence of false negatives due to aggregation is reduced at each of the positions, and particles can be counted simultaneously and more accurately.

For example, in the determining, particles containing a detection target substance, which is a certain detection target, may be selectively counted among the particles on a basis of the aggregation image and the dispersion image.

As a result, certain particles can be selectively counted in a sample containing different types of particles.

A counting apparatus according to another aspect of the present disclosure includes a storage storing a sample containing particles, an electric field gradient generator that generates an electric field gradient for the sample stored in the storage, a controller that controls the electric field gradient generator such that the generated electric field gradient aggregates the particles by action of first-direction dielectrophoretic force exerted on the particles and disperses the aggregated particles by action of second-direction dielectrophoretic force, which is different from the first-direction dielectrophoretic force, exerted on the aggregated particles, an imager that captures a dispersion image including the dispersed particles, and a counter that determines a number of the particles on a basis of the dispersion image.

As a result, a counting apparatus that produces the same effects as those produced by the counting method is achieved.

It should be noted that these general or specific aspects may be implemented as a system, an apparatus, an integrated circuit, a computer program, a computer-readable storage medium such as a CD-ROM, or any selective combination thereof.

Embodiments will be specifically described hereinafter with reference to the drawings.

All the embodiments described hereinafter are general or specific examples. Values, shapes, materials, components, arrangement positions and connection modes of the components, steps, order of the steps, and the like mentioned in the following embodiments are examples and not intended to limit the claims. Each of the figures is not necessarily a strict illustration. In each of the figures, substantially the same components are given the same reference numerals, and redundant description thereof might be omitted or simplified.

In the following description, terms indicating relationships between elements, such as parallel and perpendicular, terms indicating shapes of elements, such as rectangular, and numerical ranges do not just express strict meanings but also imply substantially the same ranges, that is, inclusion of differences of, say, several percent.

In the following description, counting of particles implies not only that particles in a sample are found on the basis of a determination whether the number of particles is 1 or more or 0 and presence of particles is checked but also that the quantity (e.g., number, concentration, etc.) of particles or a range of the quantity of particles is measured. Similarly, counting of a detection target substance implies not only that a detection target substance in a sample is found on the basis of a determination whether the number of the detection target substance is 1 or more or 0 and presence of the detection target substance is checked but also that the quantity (e.g., number, concentration, etc.) of a detection target substance or a range of the quantity of a detection target substance is measured. Particles to be counted may be all particles contained in a sample or a part of particles contained in a sample.

Dispersion of particles by the second-direction dielectrophoretic force implies not just dispersion of particles from a position at which the particles have been aggregated by the first-direction dielectrophoretic force in a radial second direction but also aggregation of particles at a position different from one at which particles have been aggregated by the first-direction dielectrophoretic force and dispersion of the particles from the original position.

Embodiment

In the present embodiment, overlap between particles due to aggregation is suppressed and the particles are counted by aggregating the particles in a liquid through dielectrophoresis (DEP) and then dispersing the aggregated particles.

DEP is a phenomenon in which force is exerted on dielectric particles exposed to a non-uniform electric field (hereinafter also referred to as an electric field gradient). This force does not require particles to be charged.

An embodiment of a counting apparatus and a counting method that achieve counting of detection target substance particles through DEP will be specifically described hereinafter with reference to the drawings.

Configuration of Counting Apparatus

Figure 2:
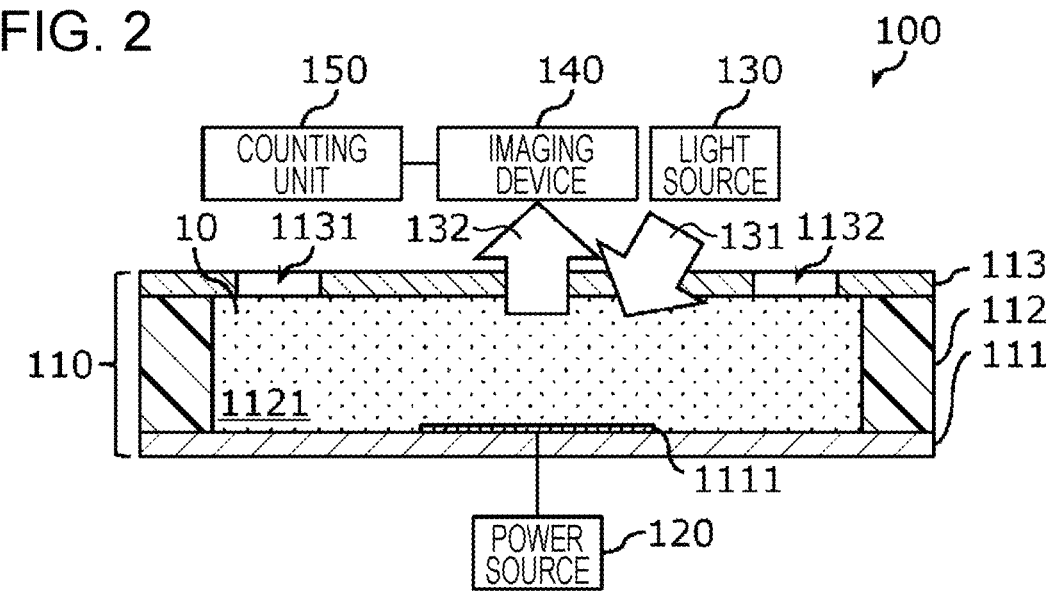
FIG. 2 is a cross-sectional view illustrating the schematic configuration of the counting apparatus according to the embodiment.

First, the configuration of the counting apparatus will be described with reference to FIGS. 1 and 2. FIG. 1 is a perspective view illustrating a schematic configuration of the counting apparatus according to the embodiment. FIG. 2 is a cross-sectional view illustrating the schematic configuration of the counting apparatus according to the embodiment. FIG. 1 especially illustrates an outline while making a part of a storage unit 110 other than a first substrate 111 transparent so that an inside of the storage unit 110 becomes visible. FIG. 1 is used to explain relationships between the storage unit 110 and other components, and does not limit an arrangement position, an arrangement direction, an orientation, and the like of each of the components at a time when a counting apparatus 100 is used. FIG. 2 is a cross-sectional view taken from the storage unit 110 illustrated in FIG. 1 along a direction parallel to a page surface. Thickness of some components of the storage unit 110 illustrated in FIG. 2 is omitted in FIG. 1.

As illustrated in FIGS. 1 and 2, the counting apparatus 100 includes the storage unit 110, a power source 120, a light source 130, an imaging device 140, and a counting unit 150.

The storage unit 110 is a container for storing a sample 10 containing particles 15 and includes a space 1121 inside thereof. The sample 10 is stored in the space 1121. DEP acts inside the space 1121 on the sample 10 stored in the space 1121, and if the sample 10 contains particles 15, the particles 15 are moved by the action of the DEP. The space 1121 provided inside the storage unit 110 thus serves as a field for DEP in the counting apparatus 100.

Here, the particles 15 are a particulate substance that exhibits dielectric properties, namely a single material substance such as polystyrene beads or glass beads, a composite substance obtained by adding a functional substance to these beads, living cells that can be macroscopically regarded as dielectric particles, or the like. The particles 15 are determined appropriately in accordance with an application of the counting apparatus 100, and various conditions for DEP are set in accordance with physical properties of the particles 15 and the like. Although the particles 15 are assumed to be polystyrene beads in the following description, the configuration and size of the particles 15 are not particularly limited as described above. The counting apparatus 100 can be used for various types of particles 15 as a counting target.

Now, the internal configuration of the storage unit 110 will be described. As illustrated in FIG. 2, the storage unit 110 includes the first substrate 111, a spacer 112, and a second substrate 113.

The first substrate 111 is, for example, a glass or resin sheet. The first substrate 111 has an upper surface that defines a bottom of the space 1121, and an electrode set 1111 to which the power source 120 applies an alternating current voltage is formed on the upper surface. The electrode set 1111 is formed in contact with the space 1121 so that when the sample 10 is stored in the space 1121, the sample 10 and the electrode set 1111 are in electrical contact with each other.

The electrode set 1111 specifically includes a first electrode 1112 and a second electrode 1113. With an alternating current voltage applied to the electrode set 1111 from the power source, the electrode set 1111 can cause (generate or form) a non-uniform electric field (electric field gradient) on the first substrate 111. The electrode set 1111 is thus an example of an electric field gradient generation unit. Details of the electrode set 1111 will be described later with reference to FIG. 3.

The spacer 112 is disposed on the first substrate 111. A through hole corresponding to a shape of the space 1121 is formed in the spacer 112. The space 1121 is formed by the through hole sandwiched by the first substrate 111 and the second substrate 113. That is, the spacer 112 is an outer wall surrounding the through hole and has an inner surface that defines the space 1121. The spacer 112 is composed of, for example, a material with high adhesion to the first substrate 111 and the second substrate 113, such as a resin.

The second substrate 113 is a transparent glass or resin sheet, for example, and disposed on the spacer 112. A polycarbonate substrate, for example, may be used as the second substrate 113. A supply hole 1131 and a discharge hole 1132 connecting to the space 1121 are formed in the second substrate 113. The sample 10 is supplied to the space 1121 through the supply hole 1131 and discharged from the space 1121 through the discharge hole 1132. The storage unit 110 may be achieved without providing the second substrate 113, instead. That is, the second substrate 113 is not a mandatory component. In this case, the space 1121 for establishing the storage unit 110 as a container is formed by the first substrate 111 and the spacer 112 that define the bottom and the inner surface thereof, respectively.

The power source 120 is an alternating current power source and applies an alternating current voltage to the electrode set 1111 on the first substrate 111.

The power source 120 may be any power source insofar as an alternating current voltage can be supplied, and is not limited to a certain power source such as that described above. An alternating current voltage may be supplied from an external power source, and in this case, the power source 120 need not be included in the counting apparatus 100. The internal configuration of the power source 120 is omitted in the following description and illustrated in a simplified manner.

The light source 130 radiates radiation light 131 onto the sample 10 in the space 1121. The radiation light 131 is radiated onto the particles 15 in the sample 10 through the second substrate 113. The particles 15 cause detection light 132 corresponding to the radiation light 131 and are detected by detecting the detection light 132. Excitation light for exciting a certain fluorescent substance, for example, may be radiated as the radiation light 131. When a fluorescent substance is dispersed in polystyrene composing the particles 15, fluorescent light is caused in accordance with the radiated excitation light, and presence of the fluorescent substance, that is, presence of the particles 15, can be detected by detecting the fluorescent light.

A known technique may be used for the light source 130 without a particular limitation. A laser such as a semiconductor laser or a gas laser, for example, may be used as the light source 130. A wavelength of the radiation light 131 radiated from the light source 130 may be one (e.g., 400 nm to 2,000 nm) at which interaction with a substance composing the particles 15 is small. Alternatively, the wavelength of the radiation light 131 may be one (e.g., 600 nm to 850 nm) at which a semiconductor laser can be used.

The light source 130 need not be included in the counting apparatus 100. When the particles 15 are large, for example, the fluorescent substance need not be contained in the particles 15. Because excitation light need not be radiated onto the particles 15 in this case, external light radiated from the sun or a fluorescent lamp can be used as the radiation light 131, and the counting apparatus 100 can be achieved without providing the light source 130.

The imaging device 140 is a complementary metal-oxide-semiconductor (CMOS) image sensors, a charge-coupled device (CCD) image sensor, or the like incorporated into a camera 141 and generates an image including the particles 15 by detecting the detection light 132 caused by the particles 15. The imaging device 140 is disposed parallel to a surface of the first substrate 111 and captures an image of an area corresponding to the electrode set 1111 through an optical element (not illustrated), such as a lens, included in the camera 141. When particles 15 exist in the area, the detection light 132 caused by radiation light 131 is incident on the imaging device 140, and the particles 15 are detected.

The counting unit 150 obtains an image output from the imaging device 140 and determines the number of particles 15 contained in the sample 10 on the basis of the image. For example, the counting unit 150 detects bright spots, at which luminance values are different, using a control image, which is an image captured in advance that does not include particles 15, by comparing the obtained image and the control image. More specifically, when emission of light is detected as the detection light 132, spots in the obtained image at which luminance values are larger than in the control image are determined as bright spots, and when transmitted light and scattered light are detected as the detection light 132, spots in the obtained image at which luminance values are smaller than in the control image may be detected as bright spots. A result of counting of the particles 15 in the sample 10 can thus be obtained.

The counting unit 150 is achieved, for example, by executing a program for conducting the above-described image analysis using a circuit such as a processor and a storage device such as a memory, but may be achieved by a dedicated circuit, instead.

Shape and Arrangement of Electrode Set

Figure 3:
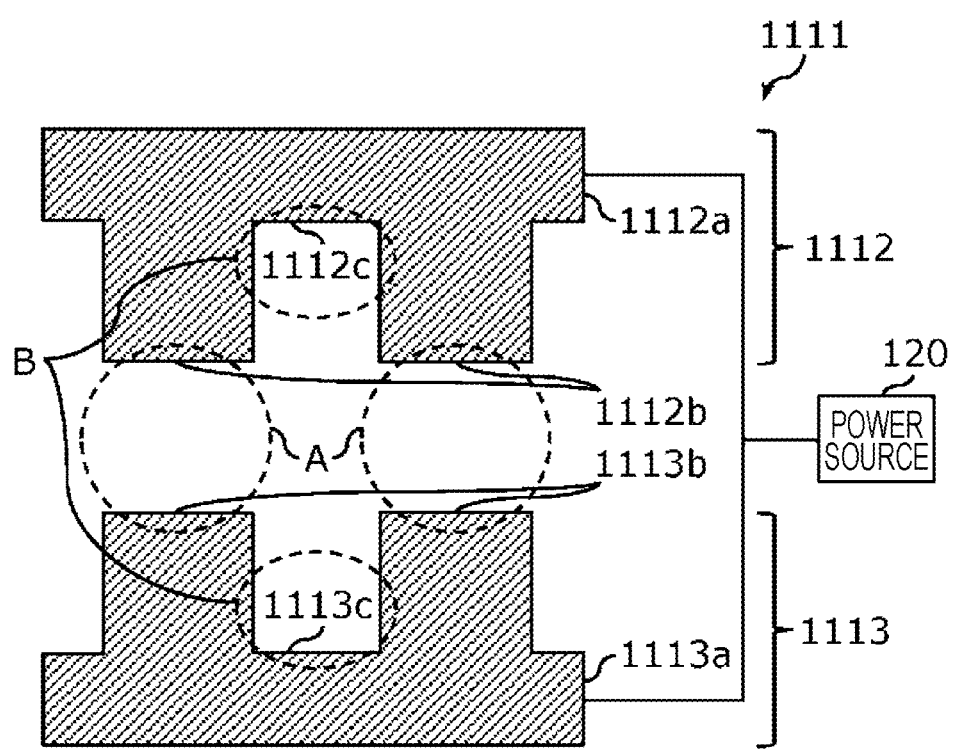
FIG. 3 is a plan view illustrating the configuration of an electrode set according to the embodiment.

Next, a shape and arrangement of the electrode set 1111 on the first substrate 111 will be described with reference to FIG. 3. FIG. 3 is a plan view illustrating the configuration of the electrode set according to the embodiment. FIG. 3 illustrates the configuration of the electrode set 1111 viewed from the imaging device 140 as a plan. FIG. 3 is a schematic configuration diagram illustrating a part of the first substrate 111 for the sake of simplicity.

As illustrated in FIG. 3, the electrode set 1111 includes the first electrode 1112 and the second electrode 1113. The first electrode 1112 and the second electrode 1113 are each electrically connected to the power source 120.

The first electrode 1112 includes a first base 1112a extending in a first direction (a page left-and-right direction in FIG. 3) and two first convexes 1112b protruding from the first base 1112a in a second direction (a page top-and-bottom direction in FIG. 3), which intersects with the first direction. A first concave 1112c is formed between the two first convexes 1112b. Lengths of the two first convexes 1112b and the first concave 1112c in the first direction and the second direction are, for example, both about 5 micrometers. Sizes of the two first convexes 1112b and the first concave 1112c are not limited to this.

A shape and a size of the second electrode 1113 are substantially the same as those of the first electrode 1112. That is, the second electrode 1113, too, includes a second base 1113a extending in the first direction (the page left-and-right direction in FIG. 3) and two second convexes 1113b protruding from the second base 1113a in the second direction (the page top-and-bottom direction in FIG. 3), which intersects with the first direction. A second concave 1113c is formed between the two second convexes 1113b. The two second convexes 1113b are disposed in such a way as to face the two first convexes 1112b of the first electrode 1112.

That is, the first electrode 1112 includes the first convexes 1112b protruding from the first base 1112a toward the second electrode 1113 in a direction intersecting with the first direction. The second electrode 1113 includes the second convexes 1113b protruding from the second base 1113a toward the first electrode 1112 in the direction intersecting with the first direction.

The first convexes 1112b and the second convexes 1113b are formed such that a distance between the first electrode 1112 and the second electrode 1113 differs depending on a position in the first direction. Since the distance between the first electrode 1112 and the second electrode 1113 differs, an electric field gradient where electric field strength differs depending on the position, that is, a non-uniform electric field, is formed when an alternating current voltage is applied to the electrode set 1111. That is, it is only required that at least one part where an inter-electrode distance is different be formed in the electrode set 1111. The electrode set 1111 may employ a configuration in which, for example, a convex is formed in the first electrode 1112 or the second electrode 1113 and no convex is formed in the other of the first electrode 1112 and the second electrode 1113. Because the above can be achieved insofar as there is at least one convex, the electrode set 1111 can be achieved by the first electrode 1112 or the second electrode 1113 including at least one convex.

A position of the electrode set 1111 is not limited to on the first substrate 111. The electrode set 1111 may be provided near the space 1121 without being in contact with the sample 10, instead. Here, near the space 1121 refers to a range within which an electric field gradient can be formed in the sample 10 with an alternating current voltage applied to the electrode set 1111.

An electric field gradient is formed as a result of the configuration of the electrode set 1111, and when the particles 15 in the sample 10 are exposed to the electric field, the particles 15 are aggregated in certain areas through DEP. In the DEP, the certain areas in which the particles 15 are aggregated differ depending on whether positive DEP or negative DEP acts on the particles 15 when an electric field gradient is formed.

More specifically, when positive DEP acts on the particles 15, the particles 15 move to areas where electric field strength is high and aggregate. The areas where electric field strength is high are areas including positions at which the distance between the first electrode 1112 and the second electrode 1113 is shortest because of the first convexes 1112b and the second convexes 1113b and, for example, are first electric field areas A indicated in the figure by broken-line circles. When negative DEP acts on the particles 15, on the other hand, the particles 15 move to areas where electric field strength is low and aggregate. The areas where electric field strength is low are areas including positions at which the distance between the first electrode 1112 and the second electrode 1113 is longest because of the first convexes 1112b and the second convexes 1113b. More specifically, the areas where electric field strength is low are areas between first concaves 1112c and second concaves 1113c. In particular, the further from the first electric field areas A, the lower the electric field strength. That is, in the figure, for example, particles 15 acted on by negative DEP aggregate in second electric field areas B indicated by broken-line circles.

Figure 4:
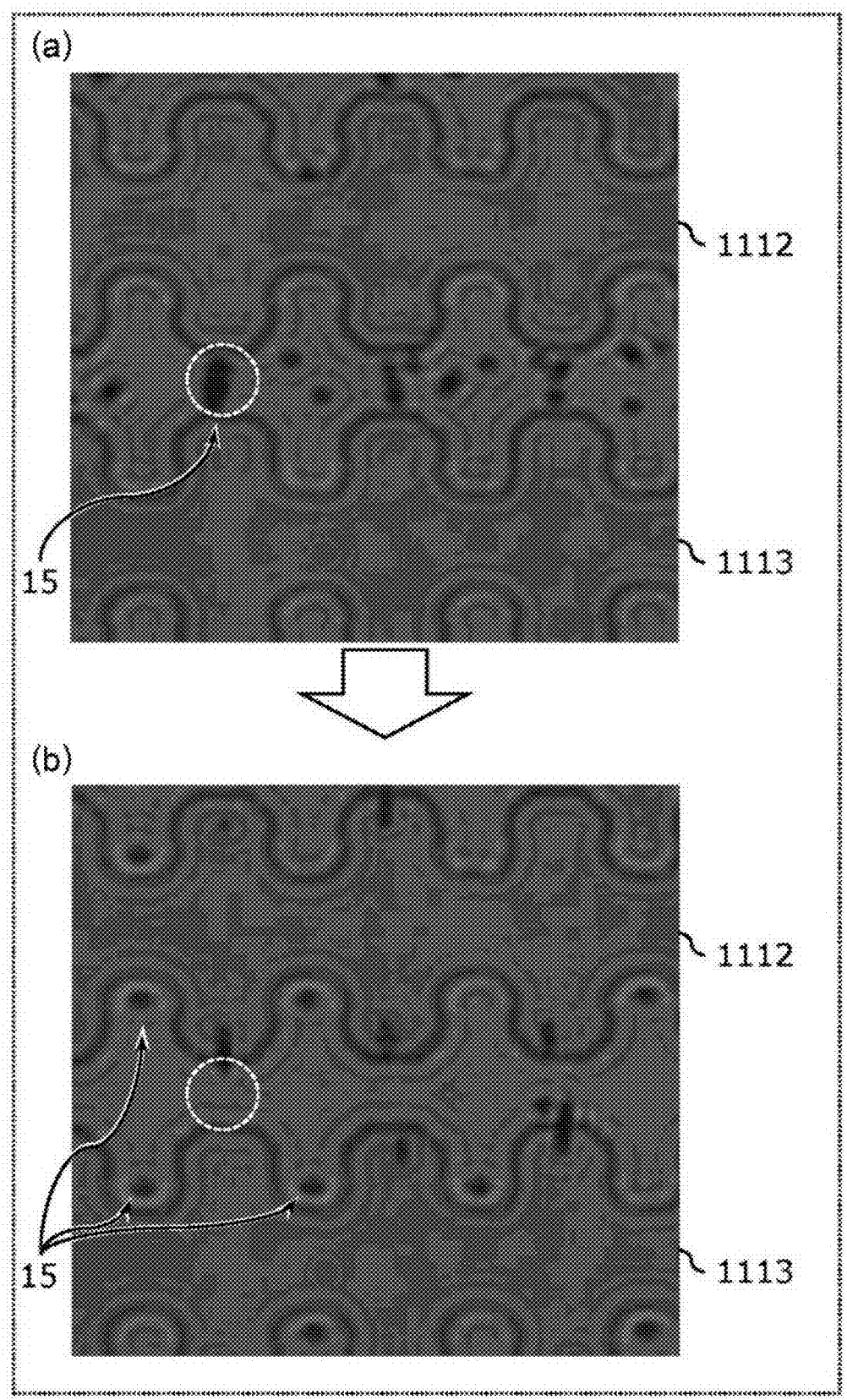
FIG. 4 is a diagram illustrating aggregation and dispersion of particles according to the embodiment.

FIG. 4 is a diagram illustrating aggregation and dispersion of particles according to the embodiment. FIG. 4(a) is a diagram illustrating particles 15 aggregated through first DEP. FIG. 4(b) is a diagram illustrating particles 15 dispersed through second DEP (i.e., dispersed by second-direction dielectrophoretic force). FIG. 4 illustrates images of the first electrode 1112 and the second electrode 1113 viewed from the same direction as in FIG. 3, and the particles 15 are shown in the figure as black spots. The first convexes 1112b protrude from the first electrode 1112 in the figure upward and downward. The first convexes 1112b protrude from the second electrode 1113 in the figure upward and downward.

As illustrated in FIG. 4(a), most of the particles 15 are aggregated between the first convexes 1112b and the second convexes 1113b through DEP. This is because positive DEP has acted on the particles 15 and the particles 15 have moved to and aggregated in areas where electric field strength is high. As illustrated in the figure, when a large number of particles 15 exist in the sample 10, the particles 15 might overlap one another and not be accurately counted through DEP in one direction.

In the present embodiment, the second-direction dielectrophoretic force different from the first-direction dielectrophoretic force is exerted on particles 15 aggregated by the first-direction dielectrophoretic force to disperse the aggregated particles 15 as described above. As illustrated in FIG. 4(b), the overlap between the particles 15 at first aggregation positions is suppressed by the second-direction dielectrophoretic force through the dispersion from the first aggregation positions, and the particles 15 can be counted more accurately. The first-direction dielectrophoretic force and the second-direction dielectrophoretic force are different from each other in terms of a direction of dielectrophoretic force. In the example illustrated in FIG. 4 in particular, the overlap between the particles 15 is suppressed because positive dielectrophoretic force changes to negative dielectrophoretic force.

That is, a change to dielectrophoretic force in a different direction includes a case where a positive dielectrophoretic force changes to another positive dielectrophoretic force whose direction is different, a case where a negative dielectrophoretic force changes to another negative dielectrophoretic force in a different direction, and a case where either positive dielectrophoretic force or negative dielectrophoretic force reverses to the other. First, particles 15 are aggregated by the first-direction dielectrophoretic force in certain electric field areas where electric field strength is high or low, and then different aggregation force is exerted by the second-direction dielectrophoretic force whose aggregation positions are different to disperse the particles 15 from the certain electric field areas. The counting apparatus 100 according to the present embodiment can accurately count the particles 15 with this method.

Change from First-Direction Dielectrophoretic Force to Second-Direction Dielectrophoretic Force As described above, the first-direction dielectrophoretic force and the second-direction dielectrophoretic force are different from each other in terms of the direction of dielectrophoretic force. In order to change the first-direction dielectrophoretic force to the second-direction dielectrophoretic force, therefore, the direction of dielectrophoretic force needs to be changed. A method for changing the direction of dielectrophoretic force will be described with reference to FIGS. 5 and 6.

Figure 5:
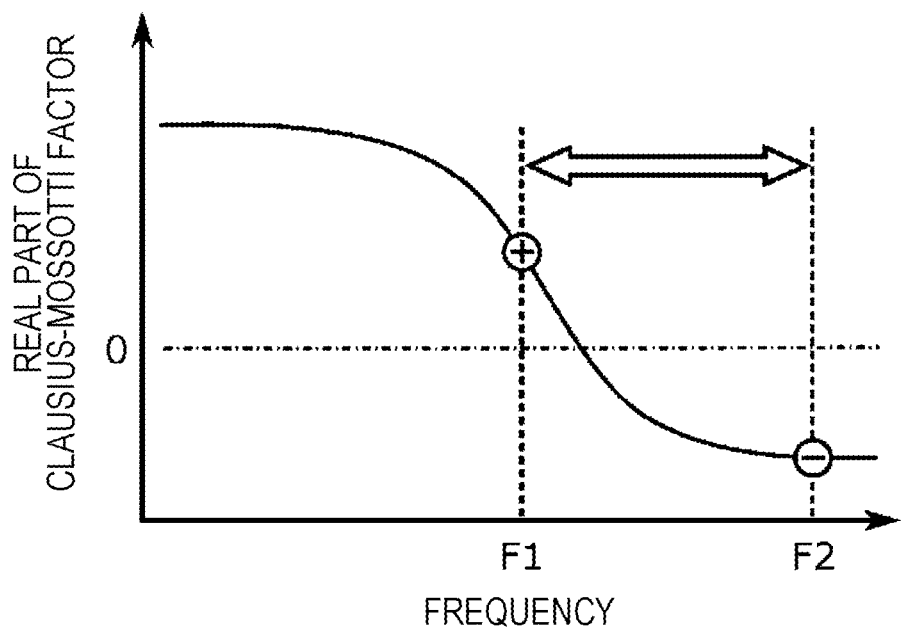
FIG. 5 is a first diagram illustrating a change in dielectrophoretic force according to the embodiment.
Figure 6:
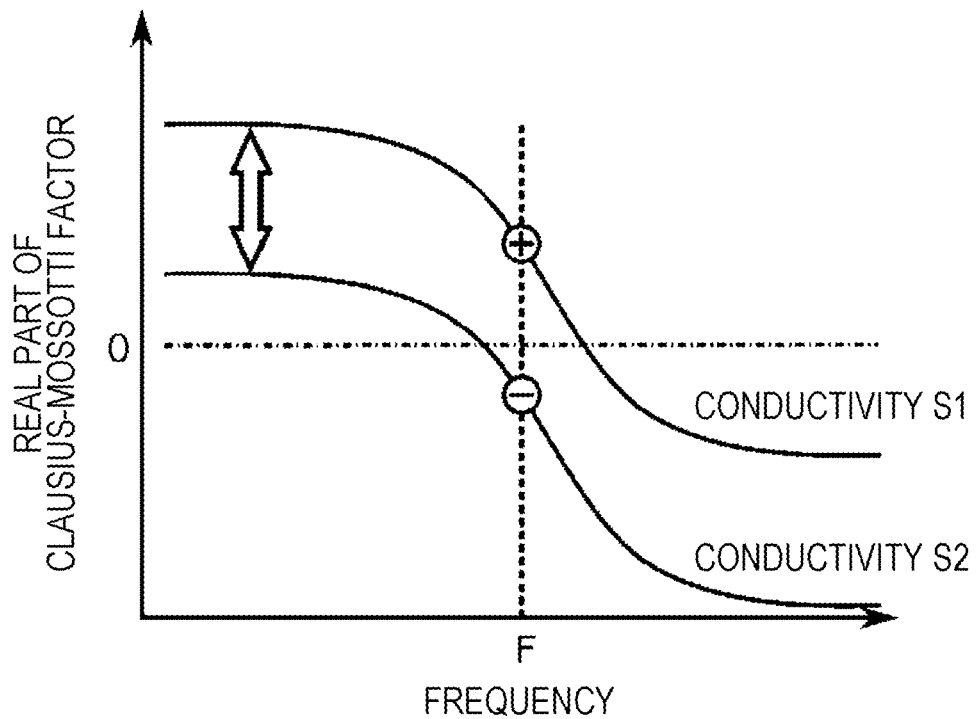
FIG. 6 is a second diagram illustrating a change in dielectrophoretic force according to the embodiment.

FIG. 5 is a first diagram illustrating a change in dielectrophoretic force according to the embodiment. FIG. 6 is a second diagram illustrating the change in dielectrophoretic force according to the embodiment. Here, methods for reversing a positive and a negative of dielectrophoretic force will be particularly described as methods for changing the direction of dielectrophoretic force.

Which of positive dielectrophoretic force or negative dielectrophoretic force is exerted correlates with particles 15 and properties of a liquid in which an electric field is formed and is particularly evaluated by a real part of a Clausius-Mossotti factor. When the real part of the Clausius-Mossotti factor is positive, positive dielectrophoretic force is exerted on the particles 15, and the particles 15 move to areas where electric field strength is higher. When the real part of the Clausius-Mossotti factor is negative, on the other hand, negative dielectrophoretic force is exerted on the particles 15, and the particles 15 move to areas where electric field strength is lower.

FIGS. 5 and 6 are graphs illustrating a relationship between the real part of the Clausius-Mossotti factor and a frequency of an alternating current voltage applied to the electrode set 1111, where a vertical axis represents the real part of the Clausius-Mossotti factor and a horizontal axis represents the frequency.

As illustrated in FIG. 5, for example, the real part of the Clausius-Mossotti factor of the particles 15 becomes a positive value with an alternating current voltage within a low frequency range and a negative value with an alternating current voltage within a high frequency range. In order to reverse a positive and a negative of dielectrophoretic force, therefore, there is a method in which, for example, the frequency of the alternating current voltage applied to the electrode set 1111 is changed.

First, in order to exert positive dielectrophoretic force as the first-direction dielectrophoretic force, an alternating current voltage within a low frequency range, where the real part of the Clausius-Mossotti factor becomes a positive value, is applied to the electrode set 1111. The particles 15 are aggregated by the positive dielectrophoretic force in areas where electric field strength is high. Thereafter, in order to exert negative dielectrophoretic force as the second-direction dielectrophoretic force, an alternating current voltage within a high frequency range, where the real part of the Clausius-Mossotti factor becomes a negative value, is applied to the electrode set 1111. The particles 15 are dispersed by the negative dielectrophoretic force to areas where electric field strength is low.

More specifically, when the first-direction dielectrophoretic force is exerted, for example, an alternating current voltage having a first frequency F1 is applied to the electrode set 1111 to aggregate the particles 15. Thereafter, when the second-direction dielectrophoretic force is exerted, an alternating current voltage having a second frequency F2, which is higher than the first frequency F1, is applied to the electrode set 1111 to disperse the particles 15. A positive and a negative may be switched between the first-direction dielectrophoretic force and the second-direction dielectrophoretic force, instead.

In order to change the frequency like this, the power source 120 changes the alternating current voltage to be applied. That is, the power source 120 is an example of a controller. The controller may be a device provided separately from the power source, instead, and may transmit a control signal to the power source 120 to change the frequency of the alternating current voltage applied from the power source 120.

In order to reverse a positive and a negative of dielectrophoretic force, for example, there is a method for changing conductivity in an environment around the particles 15 as illustrated in FIG. 6.

First, in order to exert positive dielectrophoretic force as the first-direction dielectrophoretic force, an alternating current voltage having a certain frequency F, with which the real part of the Clausius-Mossotti factor becomes a positive value, is applied to the electrode set 1111 under first conductivity S1. The particles 15 are aggregated by the positive dielectrophoretic force in areas where electric field strength is high. Thereafter, in order to exert negative dielectrophoretic force as the second-direction dielectrophoretic force, an alternating current voltage having the certain frequency F is applied to the electrode set 1111 under second conductivity S2. The particles 15 are dispersed by the negative dielectrophoretic force to areas where electric field strength is low.

More specifically, for example, when the first-direction dielectrophoretic force is exerted, an alternating current voltage having the certain frequency F is applied under the first conductivity S1, and when the second-direction dielectrophoretic force is exerted, an alternating current voltage having the certain frequency F is applied under the second conductivity S2, which is lower than the first conductivity S1. In order to change the conductivity like this, a chelating agent for forming chelate precipitates is added to an ionic component of a solvent of the sample 10 to reduce a degree of conduction. A positive and a negative of the first-direction dielectrophoretic force and the second-direction dielectrophoretic force may be switched, instead. At this time, a solution containing ions, or salt, may be added to the sample 10 to increase a degree of conduction.

An adding apparatus (not illustrated) that adds a chelating agent, a solution containing ions, or salt thus changes conductivity in the environment around the particles 15. That is, the adding apparatus is another example of the controller. The controller may be an apparatus provided separately from the adding apparatus, instead, and transmit a control signal to the adding apparatus to add a chelating agent, a solution containing ions, or salt from the adding apparatus.

When a positive dielectrophoretic force changes to another positive dielectrophoretic force whose direction is different or when a negative dielectrophoretic force changes to another negative dielectrophoretic force whose direction is different, for example, whether to apply an alternating current voltage may be simply switched between electrode sets provided at different positions. Furthermore, in this case, directions of the first-direction dielectrophoretic force and the second-direction dielectrophoretic force may match, and positions at which the particles 15 are aggregated may be different between the first-direction dielectrophoretic force and the second-direction dielectrophoretic force.

As described above, the aggregated particles 15 are dispersed by changing the first-direction dielectrophoretic force to the second-direction dielectrophoretic force whose direction of dielectrophoretic force is different from that of the first-direction dielectrophoretic force. The first-direction dielectrophoretic force and the second-direction dielectrophoretic force may be different from each other in terms of magnitude and the direction of dielectrophoretic force, instead.

Counting Method Employing Counting Apparatus

Figure 7:
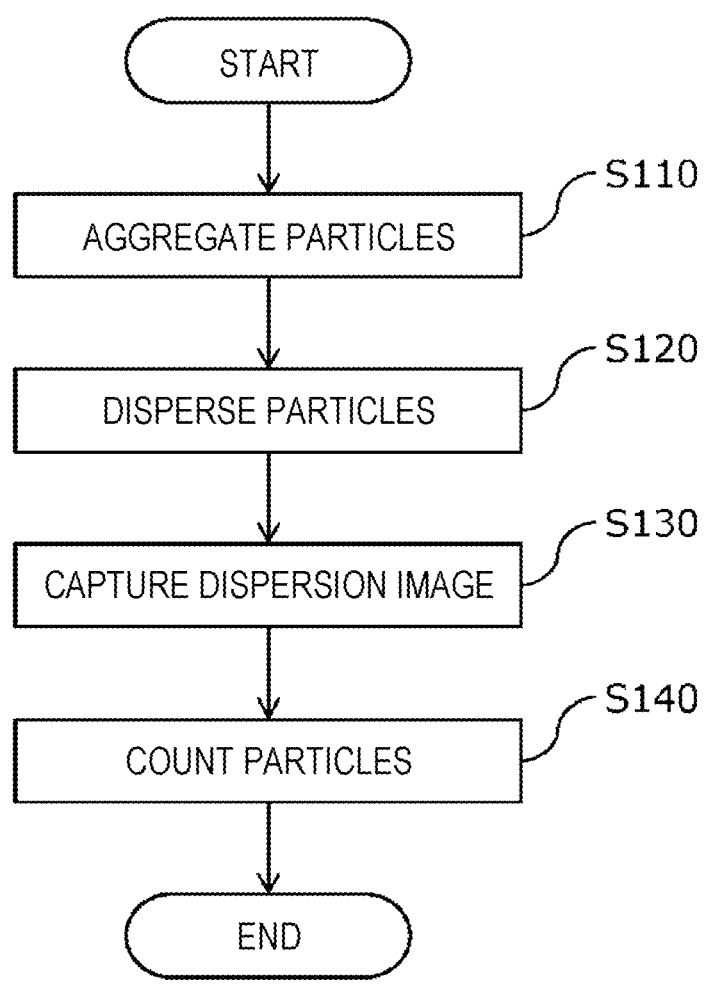
FIG. 7 is a flowchart illustrating a counting method according to the embodiment.

A method for counting the particles 15 using the counting apparatus 100 configured as above will be described with reference to FIG. 7. FIG. 7 is a flowchart illustrating the counting method according to the embodiment.

First, positive or negative first-direction dielectrophoretic force is exerted on a sample 10 containing particles 15 to aggregate the particles 15 at certain positions (aggregation step S110). Second-direction dielectrophoretic force, which is different from the first-direction dielectrophoretic force, is then exerted to disperse the aggregated particles 15 (dispersion step S120). More specifically, as described above, second-direction dielectrophoretic force different from the first-direction dielectrophoretic force exerted in aggregation step S110 in terms of the direction is exerted. Since force exerted to aggregate the particles 15 changes, the aggregation based on the first-direction dielectrophoretic force changes, and overlap between the particles 15 is suppressed.

Next, the imaging device 140 receives the detection light 132 to capture an image (imaging step S130). The image captured in imaging step S130 is a dispersion image including the dispersed particles 15. The counting unit 150 conducts an image analysis on the dispersion image to determine the number of particles 15 in the sample 10 (counting step S140). Occurrence of false negatives due to overlap between the particles 15 in the sample 10 is thus suppressed, and the particles 15 can be counted more accurately.

Modification

Figure 8:
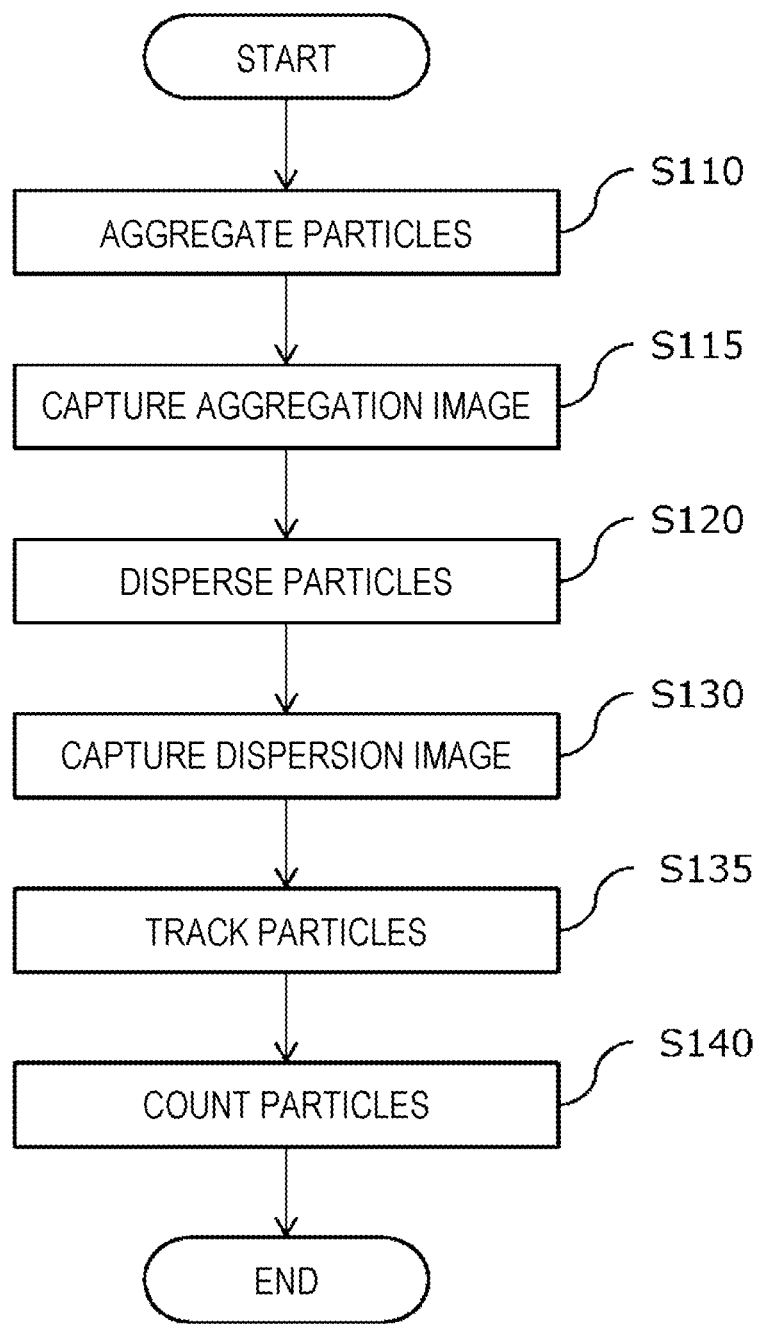
FIG. 8 is a flowchart illustrating a counting method according to a modification of the embodiment.

A modification of the present embodiment will be further described with reference to FIGS. 8 to 11. In the following description, differences from the description of the embodiment will be mainly described, and redundant description is omitted or simplified. FIG. 8 is a flowchart illustrating a counting method according to the modification of the embodiment. The counting method according to the modification illustrated in FIG. 8 is different from that according to the embodiment in that preliminary imaging step S115 and tracking step S135 are performed.

Figure 9A:
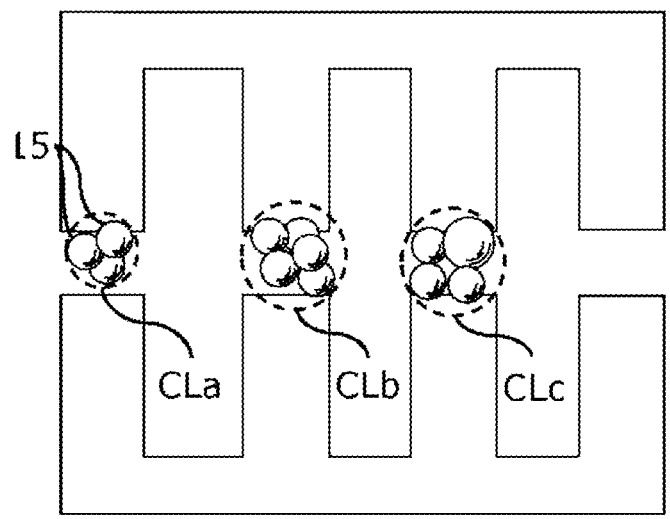
FIGS. 9A and 9B are diagrams illustrating an aggregation image and a dispersion image, respectively, according to the modification of the embodiment.
Figure 9B:
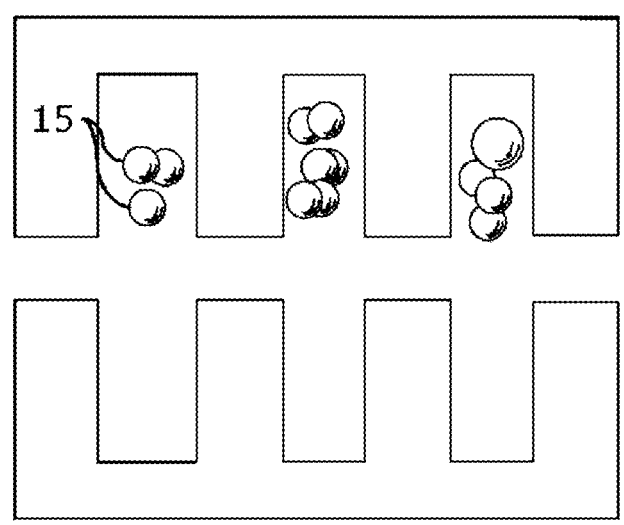

More specifically, after the particles 15 in the sample 10 are aggregated in aggregation step S110, but before dispersion step S120 is performed, the imaging device 140 receives the detection light 132 to capture an image (preliminary imaging step S115). The image captured in preliminary imaging step S115 is an aggregation image including the aggregated particles 15. FIGS. 9A and 9B are diagram illustrating an aggregation image and a dispersion image, respectively, according to the modification of the embodiment. As illustrated in FIG. 9A, particles 15 are aggregated between first convexes 1112b of a first electrode 1112 and second convexes 1113b of a second electrode 1113 in the aggregation image according to the present modification by the action of positive DEP as the first-direction dielectrophoretic force. If the first electrode 1112 and the second electrode 1113 include two or more first convexes 1112b and second convexes 1113b, respectively, at this time, particles 15 aggregate in each of spaces between the first convexes 1112b and the second convexes 1113b to form a cluster as illustrated in the figure. In the figure, for example, a first cluster CLa, a second cluster CLb, and a third cluster CLc are formed in three spaces between three first convexes 1112b and three second convexes 1113b, respectively.

When the particles 15 aggregate in separate clusters like this, overlap between the particles 15 can be reduced compared to when the particles 15 aggregate in one area. That is, occurrence of false negatives can be suppressed, and the particles can be counted more accurately. The above description also holds true when positive DEP acts as the first-direction dielectrophoretic force.

In the present modification, the particles 15 are dispersed by the second-direction dielectrophoretic force, and the dispersion image illustrated in FIG. 9B is captured (dispersion step S120 and imaging step S130). Furthermore, the counting unit 150 obtains the aggregation image and the dispersion image output in the above manner and tracks the particles 15 included in the aggregation image on the basis of these images (tracking step S135). In tracking step S135, whether each of the particles 15 dispersed in dispersion step S120 is a particle 15 included in the first cluster CLa aggregated at a first position, a particle 15 included in the second cluster CLb aggregated at a second position, or a particle 15 included in the third cluster CLc aggregated at a third position in aggregation step S110 can be determined.

Figure 10:
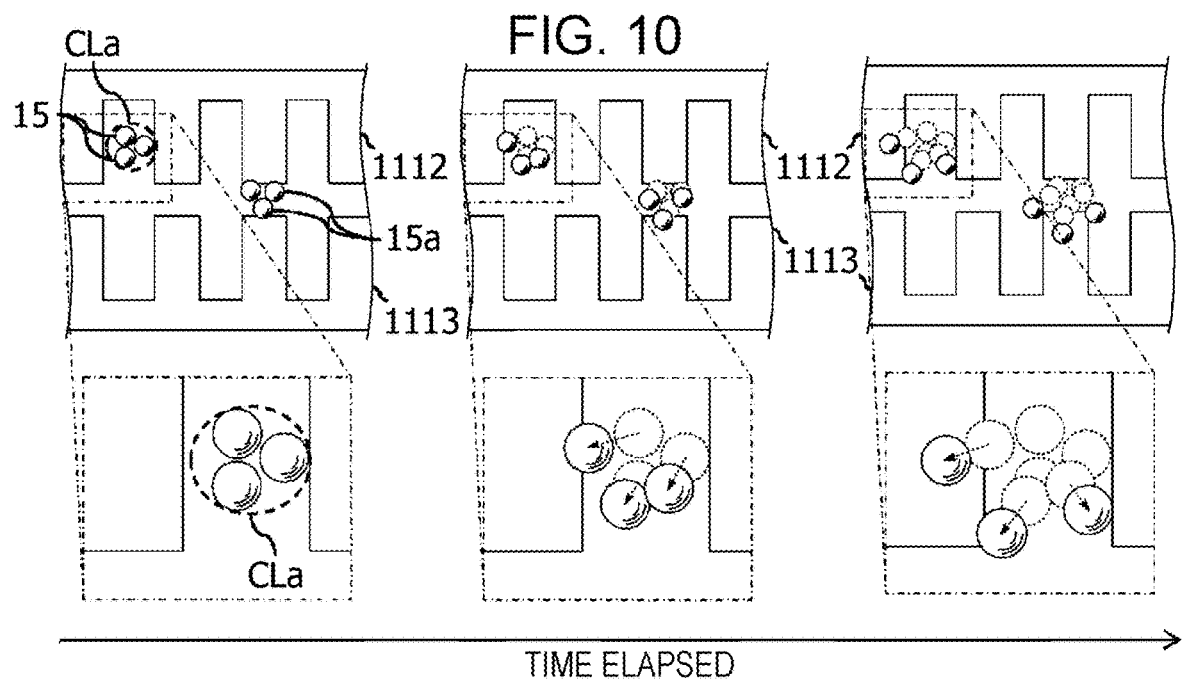
FIG. 10 is a diagram illustrating a tracking step according to the modification of the embodiment.

FIG. 10 is a diagram illustrating the tracking step according to the modification of the embodiment. The figure includes plan views of the electrode set 1111 viewed from the same point of view as in FIG. 3 and enlarged views obtained by enlarging the first cluster CLa in the plan views. The figure illustrates, from the left to the right of the figure, images obtained in time series. A left image is an aggregation image, and center and right images are dispersion images. Although the first cluster CLa will be described as an example here, the same holds for the second cluster CLb, the third cluster CLc, and other clusters. The counting unit 150 operates in tracking step S135 as follows.

First, bright spots of particles 15 or bright spots of a cluster including the particles 15 are detected in an aggregation image. The bright spots are detected by identifying pixels with which, as described above, a difference in a luminance value from a control image is larger than or equal to a threshold. Since the particles 15 might overlap one another, each of the particles 15 need not be individually detected.

Next, bright spots of the particles 15 are detected in a dispersion image. Unlike in the aggregation image, the particles 15 can be substantially individually detected in the dispersion image, which is obtained after dispersion. Detectability of the particles 15 improves especially by making time from a beginning of the dispersion to the obtaining of the dispersion image sufficiently long. When the time from the beginning of the dispersion to the obtaining of the dispersion image is made excessively long, however, particles 15 from different clusters might not be distinguished from one another, and tracking of the particles 15 might become impossible. Because dispersion speed of the particles 15 depends on properties of the particles 15, appropriate time from the beginning of the dispersion to the obtaining of the dispersion image may be set in advance on the basis of a preliminary experiment or the like. Alternatively, the imaging device 140 may output a moving image consisting of successively obtained images, and the counting unit 150 may extract dispersion images at timings at which the particles 15 have appropriately dispersed and track and count the particles 15.

The counting unit 150 estimates movement vectors on the basis of the bright spots of the particles 15 detected in the dispersion image using an algorithm for pattern matching or the like and identifies a cluster from which each of the particles 15 has been dispersed. As a result, the number of particles 15 included in each cluster can be counted for the cluster. Especially in a condition where clusters include both clusters of particles 15a aggregated through negative DEP and clusters of particles 15 aggregated through positive DEP as illustrated in the figure, accurate counting can be performed simultaneously and individually.

Figure 11:
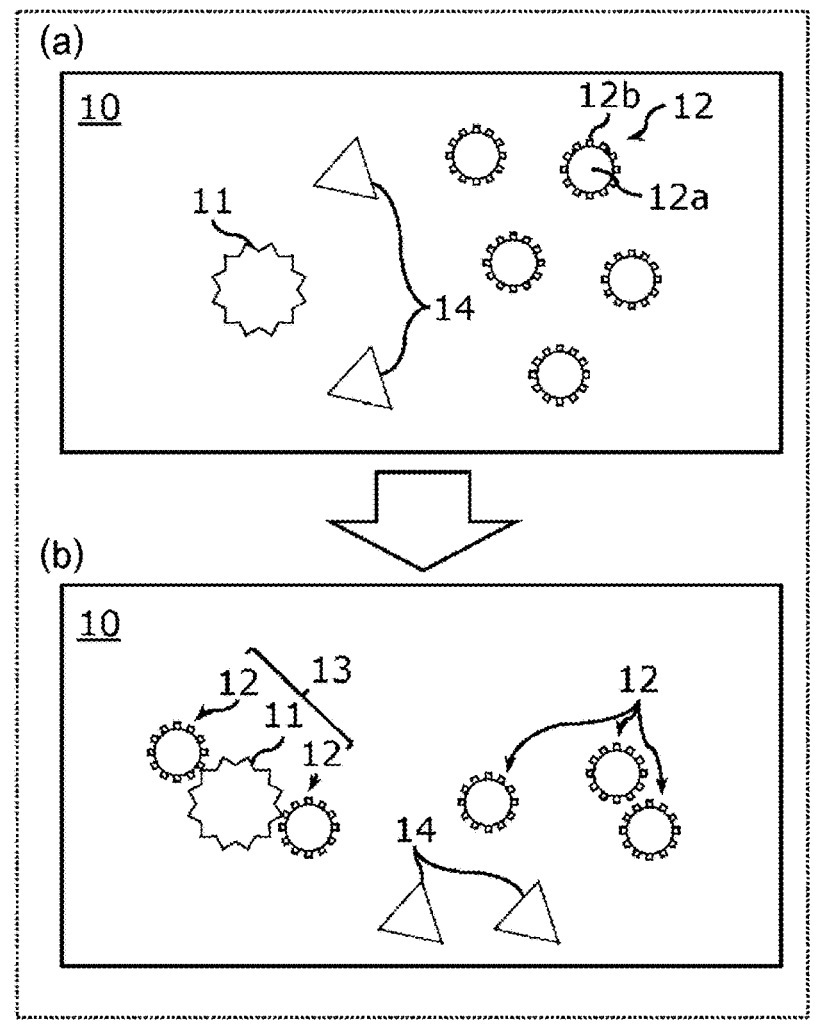
FIG. 11 is a diagram illustrating a process for forming a composite according to the modification of the embodiment.

An example of an application of the above-described counting method according to the above-described modification will be described with reference to FIG. 11. FIG. 11 is a diagram illustrating a process for forming a composite according to the modification of the embodiment. In this example, each of the particles 15 is a composite particle 13, and each of the particles 15a is an unbound particle 12 or an impurity 14. Each of the particles 15 may be an unbound particle 12 or an impurity 14, and each of the particles 15a may be a composite particle 13.

In this example, particles are counted using the counting apparatus 100 for the purpose of counting a detection target substance 11. That is, among particles in a sample 10, particles containing a detection target substance, which is a certain detection target, are selectively counted.

A composite particle 13 is a combination of the detection target substance 11 and dielectric particles 12a modified by a substance (hereinafter referred to as a specific binding substance 12b) having a property of specifically binding to the detection target substance 11. That is, in a composite particle 13, the detection target substance 11 and dielectric particles 12a bind to each other through the specific binding substance 12b. The dielectric particles 12a have the same configuration as the particles 15.

The specific binding substance 12b is a substance that can specifically bind to the detection target substance 11. Examples of the combination between the detection target substance 11 and the specific binding substance 12b include an antigen and an antibody, a substrate or a coenzyme and an enzyme, a hormone and a receptor, an antibody and protein A or protein G, biotin and avidin, calcium and calmodulin, a sugar and a lectin, and a peptide tag such as 6x histidine or glutathione S-transferase and a tag binding substance such as nickel-nitrilotriacetic acid or glutathione.

An unbound particle 12 is a dielectric particle 12a modified by a specific binding substance 12b that is not a part of a composite particle 13. That is, an unbound particle 12 is a dielectric particle 12a modified by a specific binding substance 12b that is not bound to a detection target substance 11. An unbound particle 12 is also called a free (F) component. A dielectric particles 12a included in the composite particle 13 is also called a bind (B) component.

An impurity 14 is a particle, such as dust, mixed in a detection system (the sample 10 here), a broken-piece particle of one of the components of the counting apparatus 100, or the like.

As illustrated in FIG. 11(a), a sample 10 containing a detection target substance 11 such as virus particles, dielectric particles 12a (unbound particles 12) modified by an antivirus antibody as a specific binding substance 12b, and impurities 14, for example, is prepared. In the sample 10, as illustrated in FIG. 11(b), the detection target substance 11 and the unbound particles 12 form composite particles 13 as a result of dispersion and collision in a solution. At this time, the unbound particles 12 are provided in excess so that no unbound detection target substance 11 remains. For this reason, as illustrated in the figure, the unbound particles 12 exist in excess.

Here, if operation conditions of the counting apparatus 100 are set such that either positive DEP or negative DEP acts on the composite particles 13 and another of the positive DEP or the negative DEP acts on the unbound particles 12 and the impurities 14, the composite particles 13 and the other particles aggregate while forming different clusters. The operation conditions are set by an alternating current voltage applied to an electrode set, conductivity of a solvent of the sample 10, and the like. For example, operation conditions in which the composite particles 13 correspond to the particles 15 and the other particles correspond to the particles 15a are used. In this example, a detection target substance 11, which is a certain detection target among particles contained in a sample 10, can be selectively and accurately counted by aggregating the composite particles 13 and the other particles at different positions and then accurately counting the composite particle 13 and the other particles after dispersion.

Other Embodiments

Although the counting apparatus and the counting method according to one or more aspects of the present disclosure have been described above on the basis of an embodiment, the present disclosure is not limited to the embodiment. The scope of the one or more aspects of the present disclosure may also include modes obtained by modifying the present embodiment in various ways conceivable by those skilled in the art, insofar as the spirit of the present disclosure is not deviated from.

Although the first convexes and the second convexes face each other and the first concaves and the second concaves face each other in the arrangement of the electrode set on the first substrate in the embodiment, for example, the arrangement of the electrode set is not limited to this. For example, the first convexes and the second concaves may face each other, and the first concaves and the second convexes may face each other in the arrangement, instead. The electrode set may be configured such that electric field gradients suitable for various types of counting are formed on the basis of the arrangement of the electrode set and design of shapes of the first and second electrodes, instead.

The number of electrodes included in the electrode set is not limited to two, and may be three or more, instead. For example, the electrode set illustrated in FIG. 4 also includes second electrodes disposed outside the figure at both ends of a page top-and-bottom direction, in addition to the first electrode in the figure described above. Such an electrode set includes three or more electrodes, and a phase difference is provided between alternating current voltages applied to adjacent electrodes. Such an electrode set is sometimes called castellated electrodes.

Aggregated particles may be dispersed more effectively by combining together some of the methods, which have been described above, for changing the first-direction dielectrophoretic force to the second-direction dielectrophoretic force.

Figure 12:
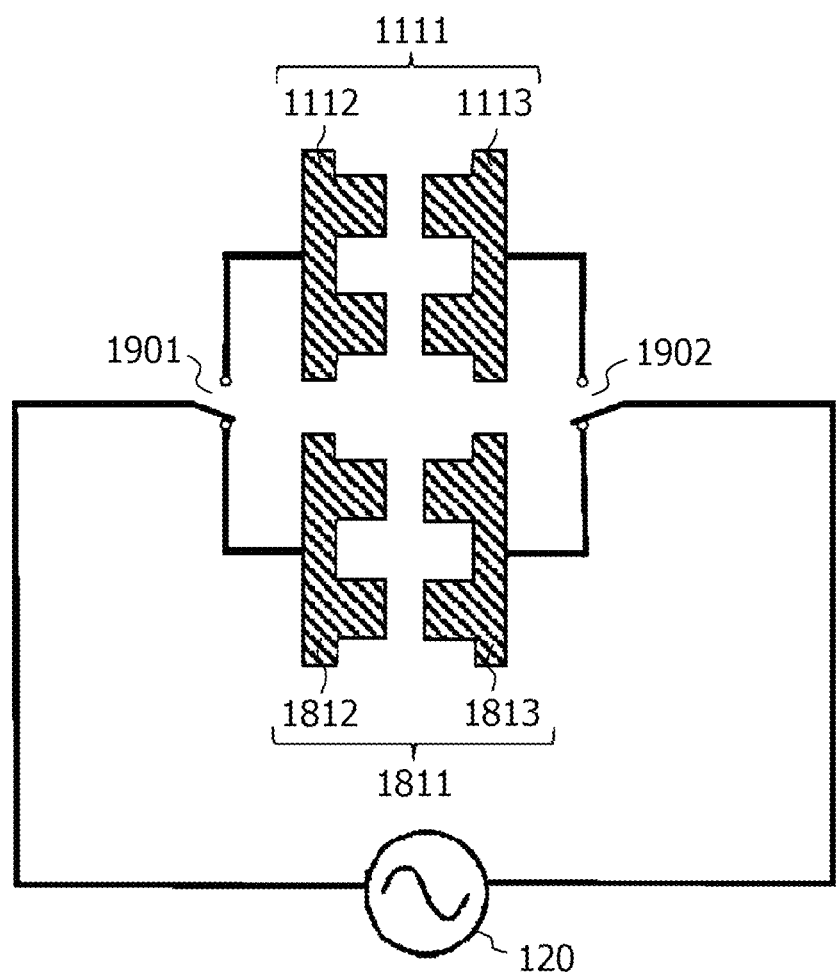
FIG. 12 is a circuit diagram including a first electrode set and a second electrode set according to the modification of the embodiment.

The counting apparatus 100 may also include a second electrode set 1811 in addition to a first electrode set 1111. FIG. 12 is a circuit diagram including a first electrode set and a second electrode set according to another modification of the embodiment.

The first electrode set 1111 includes a first electrode 1112 and a second electrode 1113. The second electrode set 1811 includes a third electrode 1812 and a fourth electrode 1813.

In the aggregation step, the controller instructs a switch 1901 to connect a power source 120 and the first electrode 1112 to each other, a switch 1902 to connect the power source 120 and the second electrode 1113 to each other, and the power source 120 to generate an alternating current voltage having a first frequency. As a result, first-direction dielectrophoretic force is exerted on particles 15 in the aggregation step.

In the aggregation step, the controller instructs the switch 1901 to connect the power source 120 and the third electrode 1812 to each other, the switch 1902 to connect the power source 120 and the fourth electrode 1813 to each other, and the power source 120 to generate an alternating current voltage having a second frequency. As a result, in the dispersion step, second-direction dielectrophoretic force is exerted on the particles 15 in the dispersion step.

Applicable as a counting apparatus that counts dielectric particles.

What is claimed is:

1. A counting method comprising:
aggregating particles in a sample by applying a first alternating current having a first frequency to an electrode set, the electrode set including (i) a first electrode including a first base extending in a first direction, two first convex portions protruding from the first base in a second direction perpendicular to the first direction, and a first concave portion formed between the two first convex portions and (ii) a second electrode including a second base extending in the first direction, two second convex portions protruding from the second base in the second direction perpendicular to the first direction, and a second concave portion formed between the two second convex portions, the first electrode and the second electrode being arranged such that the two first convex portions of the first electrode face the two second convex portions of the second electrode,
wherein the applying the first alternating current having the first frequency to the electrode set causes the particles to aggregate and overlap in a space between one of the two first convex portions of the first electrode and one of the two second convex portions of the second electrode by action of a first-direction dielectrophoretic force exerted by a first electric field gradient generated by the application of the first alternating current having the first frequency to the electrode set, the one of the two first convex portions of the first electrode and the one of the two second convex portions of the second electrode facing each other,
wherein the counting method further comprises dispersing the aggregated particles by applying a second first alternating current having a second frequency to the electrode set, the second frequency being higher than the first frequency,
wherein the applying the second alternating current having the second frequency to the electrode set suppresses the overlap of the aggregated particles by dispersing aggregated particles to one of first concave portion of the first electrode or the second concave portion of the second electrode by action of a second-direction dielectrophoretic force exerted by a second electric field gradient generated by the application of the second alternating current having the second frequency to the electrode set, the second-direction dielectrophoretic force being different from the first-direction dielectrophoretic force, and
wherein the counting method further comprises:
capturing a dispersion image including the particles after being dispersed to one of first concave portion of the first electrode or the second concave portion of the second electrode by action of the second-direction dielectrophoretic force; and
determining a number of the particles on a basis of the dispersion image.

2. The counting method according to claim 1, wherein the second-direction dielectrophoretic force is higher than the first-direction dielectrophoretic force.

3. The counting method according to claim 1, wherein the first-direction dielectrophoretic force is either a positive dielectrophoretic force or a negative dielectrophoretic force, and the second-direction dielectrophoretic force is the other of the positive dielectrophoretic force or the negative dielectrophoretic force.

4. The counting method according to claim 1, further comprising:
capturing an aggregation image including the aggregated particles after the aggregating but before the dispersing; and
tracking the particles included in the captured aggregation image on a basis of the aggregation image and the dispersion image.

5. The counting method according to claim 4, wherein, in the tracking, whether each of the particles dispersed in the dispersing is a particle aggregated at a first position or a particle aggregated at a second position, which is different from the first position, in the aggregating is determined.

6. The counting method according to claim 4, wherein, in the determining, particles containing a detection target substance, which is a certain detection target, are selectively counted among the particles on a basis of the aggregation image and the dispersion image.

7. A counting apparatus comprising:
a storage storing a sample containing particles and an electrode set including (i) a first electrode including a first base extending in a first direction, two first convex portions protruding from the first base in a second direction perpendicular to the first direction, and a first concave portion formed between the two first convex portions and (ii) a second electrode including a second base extending in the first direction, two second convex portions protruding from the second base in the second direction perpendicular to the first direction, and a second concave portion formed between the two second convex portions, the first electrode and the second electrode being arranged such that the two first convex portions of the first electrode face the two second convex portions of the second electrode;
a controller that controls a power source connected to the electrode set, the controller causing the power source to (i) apply a first alternating current having a first frequency to the electrode set causes the particles to aggregate and overlap in a space between one of the two first convex portions of the first electrode and one of the two second convex portions of the second electrode by action of a first-direction dielectrophoretic force exerted by a first electric field gradient generated by the application of the first alternating current having the first frequency to the electrode set, the one of the two first convex portions of the first electrode and the one of the two second convex portions of the second electrode facing each other, and (ii) apply a second alternating current having a second frequency to the electrode set to suppress the overlap of the aggregated particles by dispersing aggregated particles to one of first concave portion of the first electrode or the second concave portion of the second electrode by action of a second-direction dielectrophoretic force exerted by a second electric field gradient generated by the application of the second alternating current having the second frequency to the electrode set, the second-direction dielectrophoretic force being different from the first-direction dielectrophoretic force;

an imager that captures a dispersion image including the particles after being dispersed to one of first concave portion of the first electrode or the second concave portion of the second electrode by action of the second-direction dielectrophoretic force; and a counter that determines a number of the particles on a basis of the dispersion image.

* * * * *